(12) United States Patent
Cheung et al.

(10) Patent No.: US 8,045,021 B2
(45) Date of Patent: Oct. 25, 2011

(54) MEMORY ORGANIZATIONAL SCHEME AND CONTROLLER ARCHITECTURE FOR IMAGE AND VIDEO PROCESSING

(75) Inventors: Joseph Cheung, San Diego, CA (US); Stephen Molloy, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 996 days.

(21) Appl. No.: 11/327,241

(22) Filed: Jan. 5, 2006

(65) Prior Publication Data

US 2007/0153095 A1 Jul. 5, 2007

(51) Int. Cl.
*H04N 5/76* (2006.01)
*G06F 13/00* (2006.01)

(52) U.S. Cl. .................... 348/231.99; 711/168
(58) Field of Classification Search ............ 348/231.99; 345/540; 711/168
See application file for complete search history.

(56) References Cited

U.S. PATENT DOCUMENTS

| | | |
|---|---|---|
| 4,541,075 A | 9/1985 | Dill et al. |
| 5,083,257 A | 1/1992 | Kennedy |
| 5,265,172 A * | 11/1993 | Markandey et al. .......... 382/107 |
| 5,585,863 A | 12/1996 | Hackett et al. |
| 6,675,187 B1 * | 1/2004 | Greenberger ................. 708/622 |
| 6,778,177 B1 * | 8/2004 | Furtner ........................ 345/544 |

FOREIGN PATENT DOCUMENTS

| | | |
|---|---|---|
| EP | 0255280 | 2/1988 |
| EP | 0279693 | 8/1988 |
| JP | 7320027 A | 12/1995 |
| JP | 10334226 A | 12/1998 |
| JP | 2004326814 A | 11/2004 |
| WO | 9739437 | 10/1997 |

OTHER PUBLICATIONS

International Search Report, PCT/US2007/060188—International Search Authority—European Patent Office—Nov. 4, 2008.
Written Opinion, PCT/US2007/060188—International Search Authority—European Patent Office—Nov. 4, 2008.

* cited by examiner

*Primary Examiner* — Sinh Tran
*Assistant Examiner* — Mark Monk
(74) *Attorney, Agent, or Firm* — Timothy F. Loomis; John Rickenbrode (57) ABSTRACT

This disclosure describes an organizational scheme for memory that is useful for image processing. A memory controller architecture is also described, which takes advantage of the organizational scheme. The organizational scheme and controller architecture is particularly useful for high performance, high quality image processing of images that form a video sequence, but may also be applied in other image processing settings. The described techniques and organizational structure of the memory also allows the memory to be shared for other storage applications of a video device.

37 Claims, 6 Drawing Sheets

MEMORY ORGANIZATIONAL SCHEME AND CONTROLLER ARCHITECTURE FOR IMAGE AND VIDEO PROCESSING

TECHNICAL FIELD

The invention relates to image and video processing, and more particularly, to memory storage techniques for image frame processing of a video sequence.

BACKGROUND

Digital video capabilities can be incorporated into a wide range of devices, including digital televisions, digital direct broadcast systems, wireless communication devices, portable digital assistants (PDAs), laptop computers, desktop computers, direct two-way communication devices (sometimes referred to as "walkie-talkies"), and radiotelephones such as cellular, satellite or terrestrial-based radiotelephones. These devices can provide significant improvements over conventional analog video systems in creating, modifying, transmitting, storing, and playing full motion video sequences.

A number of video processing and coding techniques have been established for communicating digital video sequences. The Moving Picture Experts Group (MPEG), for example, has developed a number of video coding standards including MPEG-1, MPEG-2 and MPEG-4. Other standards include the ITU H.263 standard and the ITU H.264 standard. Furthermore, a number of proprietary standards have also been developed by various companies, and new standards continue to emerge and evolve.

Many of these video standards make use of data compression. For example, many video coding techniques utilize graphics and video compression algorithms designed to compress data by exploiting temporal or inter-frame correlation, to provide inter-frame compression. The inter-frame compression techniques exploit data redundancy across frames by converting pixel-based representations of image frames to motion representations. In addition, the video compression techniques often use similarities within image frames, referred to as spatial or intra-frame correlation, allowing for intra-frame compression in which the motion representations within an image frame can be further compressed. The intra-frame compression is typically based upon conventional processes for compressing still images, such as discrete cosine transform (DCT) transformation.

Prior to performing video compression, however, a number of "front-end" image processing techniques are often performed on the image frames of a video sequence. For example, front-end image processing techniques are often used on images generated from an image sensor. Examples of such image processing techniques include demosaicing, lens rolloff correction, scaling, color correction, color conversion, and spatial filtering, to name a few. The processing may improve visual image quality attributes such as tone reproduction, color saturation, hue reproduction and sharpness.

For example, some image sensors used in video applications sample a scene using a color filter array (CFA) arranged on a surface of the respective sensors. A variety of CFA patterns may be used, and a digital signal processor (DSP) may be used to obtain three color values for each photosite. However, in order to obtain high quality color video images, image processing techniques may be required. These image processing techniques are refereed to herein as "front-end" image processing insofar as the techniques generally precede image compression or other video coding by a video coding unit. In other literature, however, these image processing techniques may be referred to as "post processing" steps since the processing occurs after images are captured by the image sensors.

Unfortunately, these image processing steps can present problems for real-time video encoding in real time video telephony (VT) applications. For example, in order to ensure real-time transmission of video sequences, all of the image processing needs to be performed very quickly. Accordingly, real-time image processing may require a very high bandwidth memory and large memory capacity in order to ensure that the extensive image processing, typically by several different image processing modules, can be executed. Unfortunately, memory bandwidth and memory space is limited for most video coding devices.

SUMMARY

This disclosure describes an organizational scheme for memory that is useful for image processing. The organizational scheme is particularly useful for high quality, high performance image processing of images that form a video sequence, but may also be applied in other image processing settings. The described techniques and organizational structure of the memory also allows the memory to be shared for other storage applications of a video device.

In accordance with this disclosure, memory words are defined to include pixel data for a plurality of images. For example, each memory word may include pixel data for several sequential images in a processing pipeline or a video sequence. Contiguous memory words of the memory may include data for contiguous pixels of the sequential images. A memory controller architecture is also described that facilitates separation of the pixel data from each memory word, in order to allow the pixel data of different images to be sent to different image processing modules for parallel image processing. The arrangement of image data in shared memory words, according to this disclosure, can accelerate image sensor processing, and may be particularly desirable for real-time video telephony (VT) applications. In addition, the memory organizational scheme and controller architecture described herein may also support the ability to store within the memory words other information, such as 32-bit or 64-bit instructions executed by a digital signal processor (DSP) of the device, or other types of non-pixel information. Therefore, the memory arrangement and controller architecture described herein may allow the memory to be shared for both front-end video processing and other applications.

In one embodiment, this disclosure provides a method comprising storing in a memory a first memory word that includes first pixel data of a first image and first pixel data of a second image, and storing in the memory a second memory word that includes second pixel data of the first image and second pixel data of the second image.

In another embodiment, this disclosure provides a device comprising a memory including a first memory word that includes first pixel data of a first image and first pixel data of a second image, and a second memory word that includes second pixel data of the first image and second pixel data of the second image, and a controller that accesses the first memory word in a memory access cycle to deliver the first pixel data of the first and second images.

In another embodiment, this disclosure provides a memory comprising a first memory word that includes first pixel data of a first image and first pixel data of a second image, and a second memory word that includes second pixel data of the first image and second pixel data of the second image.

The details of one or more embodiments of the invention are set forth in the accompanying drawings and the description below. Other features, objects, and advantages of the invention will be apparent from the description and drawings, and from the claims.

DETAILED DESCRIPTION

This disclosure describes an organizational scheme for memory in which pixel data for a plurality of different images is included in memory words. In other words, a given memory word may be defined to include pixel data for multiple images. Continuous pixels of several images are stored in contiguous rows of the memory, with each row being defined by a memory word that includes pixel data for one or more images. The arrangement of image data in memory words, according to this disclosure, can accelerate front-end image processing, which is particularly desirable for real-time video telephony (VT). A memory controller architecture is also described that facilitates separation of the pixel data from each memory word, in order to allow the pixel data of different images to be sent to different image processing modules for parallel image processing. In some embodiments, a given memory word may be "shared" by multiple parallel image processing operations in that image data for multiple images may be simultaneously demultiplexed (i.e., distributed) from the shared memory words to multiple image processing operations. This allows, in effect, multiple image processing operations to simultaneously access shared memory words and process different images encapsulated within different portions of the memory words.

The described memory organizational scheme and controller architecture may also support the ability to store other information, such as 32-bit or 64-bit instructions executed by a digital signal processor (DSP) of the device, information stored as a cache, or other types of data. In other words, the memory organizational scheme allows for relatively wide memory words, e.g., 64-bits wide, which allow the memory to be used for many applications. At the same time, the described memory controller architecture allows the relatively wide memory words to be separated into smaller units, e.g., to separate out the pixels of several images from a given memory word, so that the pixels of several images can be processed in parallel by front-end image processing modules. In this manner, the described organizational scheme and controller architecture may accelerate front-end image processing, which is particularly desirable for real time video telephony (VT) applications.

Figure 1:
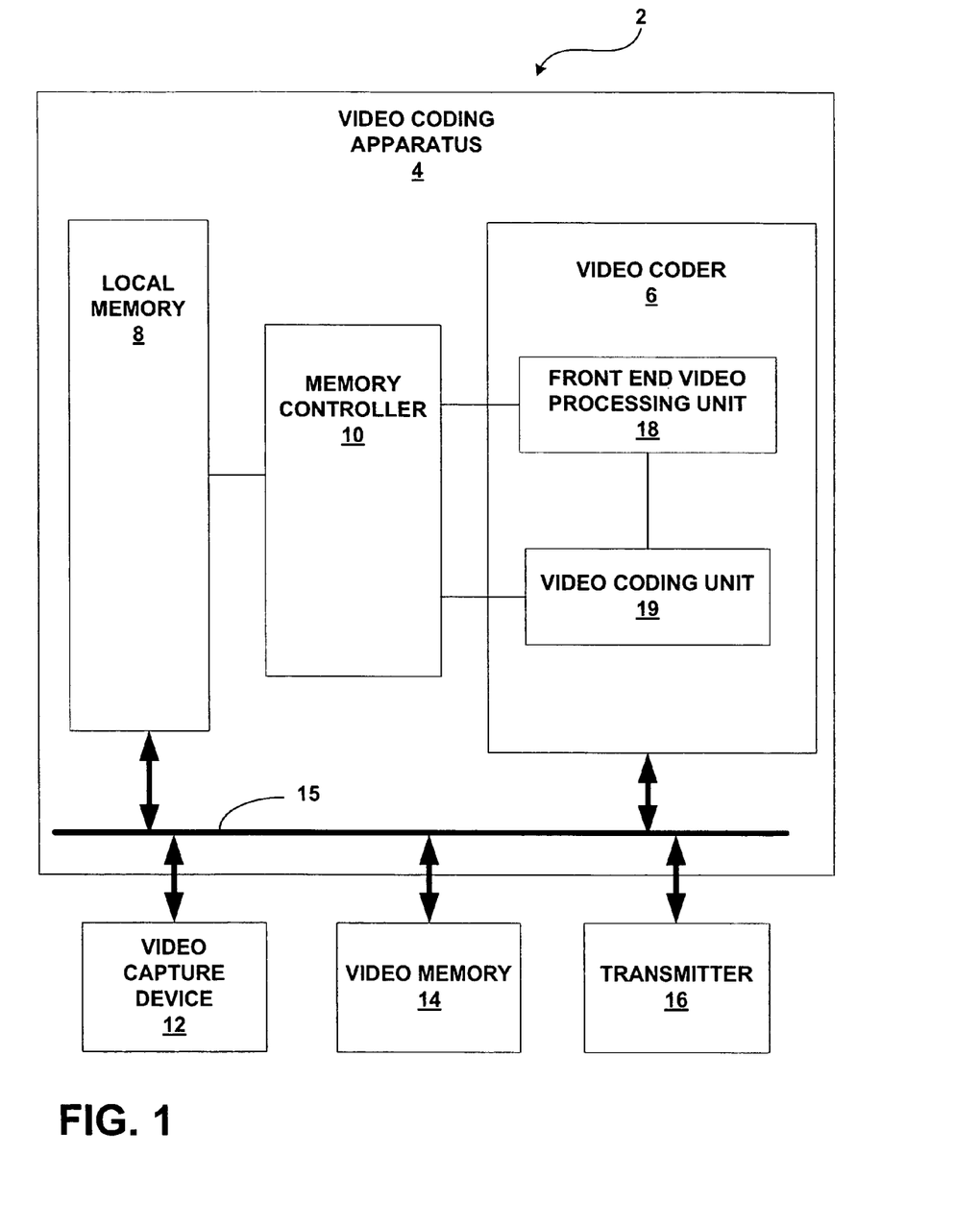
FIG. 1 is a block diagram illustrating an exemplary device that may implement the memory organization techniques described herein.

FIG. 1 is a block diagram illustrating an exemplary video coding device 2. Video coding device 2 may form part of a digital video device capable of coding and transmitting video data. The video data may be captured from a video camera, retrieved from a video archive, or obtained in another manner. Coding device 2 may implemented within devices such as digital televisions, digital direct broadcast systems, wireless communication devices, personal digital assistants (PDAs), laptop computers, desktop computers, digital cameras, digital recording devices, network-enabled digital televisions, cellular or satellite radio telephones, or any telecommunication device with VT capabilities. Coding device 2 may comply with a video coding standard such as MPEG-4, ITU-T H.263, ITU-T H.264, or any other video coding standard. Coding device 2 may support inter-frame coding techniques such as motion estimation and motion compensation, and may also support other techniques, such as spatial estimation and intra-prediction coding techniques used for intra-frame coding.

As shown in FIG. 1, coding device 2 includes a video coding apparatus 4 to code video sequences, and a video memory 14 to store the video sequences before and after such coding. Device 2 may also include a transmitter 16 to transmit the coded sequences to another device, and possibly a video capture device 12, such as a video camera, to capture video sequences and store the captured sequences in memory 14. The various elements of coding device 2 may be communicatively coupled via a communication bus 15. A number of other elements may also be included in coding device 10, but are not specifically illustrated in FIG. 1 for simplicity. The architecture illustrated in FIG. 1 is merely exemplary, as the techniques described herein may be implemented with a variety of other architectures.

Video memory 14 typically comprises a relatively large memory space. Video memory 14, for example, may comprise dynamic random access memory (DRAM), or FLASH memory. Memory 14 may be based on the so called "NOR" or "NAND" memory technology, or any other data storage technology. In other examples, video memory 14 may comprise a non-volatile memory or any other type of data storage unit.

Video coding apparatus 4 may comprise a so called "chip set" for a mobile radiotelephone, including a combination of hardware, software, firmware, and/or one or more microprocessors, digital signal processors (DSPs), application specific integrated circuits (ASICs), field programmable gate arrays (FPGAs), or various combinations thereof. Video coding apparatus 4 generally includes a video coder 6 coupled to a local memory 8. Video coder 6 may comprise an encoder/decoder (CODEC) for encoding and decoding digital video data. Local memory 8 may comprise a smaller and faster memory space relative to video memory 14. By way of example, local memory 8 may comprise synchronous dynamic random access memory (SDRAM). Local memory 8 may comprise "on-chip" memory integrated with the other components of video coding apparatus 4 to provide for very fast access to data during the processor-intensive coding process. However, memories 14 and 8 may be combined into the same memory part, or may be implemented in a number of other configurations.

Video coding apparatus 4 includes a memory controller 10 that controls memory fetches and write-backs to local memory 8. Again, the architecture illustrated in FIG. 1 is merely exemplary, as the techniques implemented in memory 8 and memory controller 10 could also be applied to other architectures, and could also be applied to the organization of external memory 14.

By way of example, video coder 6 may include a front-end video processing unit 18 and a video coding unit 19. Front-end video processing unit 18 generally performs one or more image processing techniques on the frames of a video sequence in order to improve the image quality, and thereby improve the quality of a video sequence. For example, front-end video processing unit 18 may perform techniques such as demosaicing, lens rolloff correction, scaling, color correction, color conversion, and spatial filtering. In addition, front-end video processing unit 18 may perform other techniques. In general, the techniques performed by unit 18 are refereed to as "front-end" image processing techniques insofar as the techniques generally precede coding by video coder 6.

Video capture device 12 may comprise image sensors that include color filter arrays (CFAs) arranged on a surface of the respective sensors. In this case, the front-end image processing performed by unit 18 can improve the quality of the video sequence captured by device 12. For example, video coder 6 may comprise a DSP programmed to define unit 18, which performs the front-end processing of images captured by image capture device 12. As described herein, the organization scheme implemented in memory 8 can improve image processing bandwidth efficiency and allow the same area of memory 8 (or memory 14) to be used for both these front-end image processing purposes, and for other storage purposes.

Video coding unit 19 performs viding coding, which may include one or more video compression techniques, such as inter-frame compression or intra-frame compression. For example, video coding unit 19 may implement motion estimation and motion compensation techniques to exploit temporal or inter-frame data correlation to provide for inter-frame compression. Alternatively or additionally, video coding unit 19 may perform spatial estimation and intra-prediction techniques to exploit spatial or intra-frame data correlation to provide for intra-frame compression. The output of motion compensation (or intra-prediction) is referred to as the "residual," and generally comprises a block of data indicative of the differences between the current video block to be coded and the prediction block identified by motion estimation or spatial estimation.

After video coding unit 19 has performed motion compensation (or intra-prediction) to create the residual, a series of additional steps can also be performed to further code the residual and further compress the data. The additional steps that are performed may depend on the coding standard being used, but are generally referred to as "residual coding." In any case, video coding unit 19 performs one or more of these video compression techniques in order to reduce the amount of data needed to communicate a video sequence to another device, e.g., via transmitter 16 of video device 2.

The techniques of this disclosure are readily applicable during image processing by front-end video processing unit 18. In particular, this disclosure contemplates organizational techniques for local memory 8 (or a similar memory such as external memory 14) that can improve image processing bandwidth efficiency and allow the same area of memory 8 (or memory 14) to be used for other storage purposes, e.g., for video compression or even for non-video applications. In addition, this disclosure proposes an architecture for memory controller 10 that can exploit the data organizational scheme in memory 8 (or memory 14). Although described for exemplary purposes with respect to front-end image processing, the memory architecture described herein may be applied to other environments where multiple images are processed.

Figure 2:
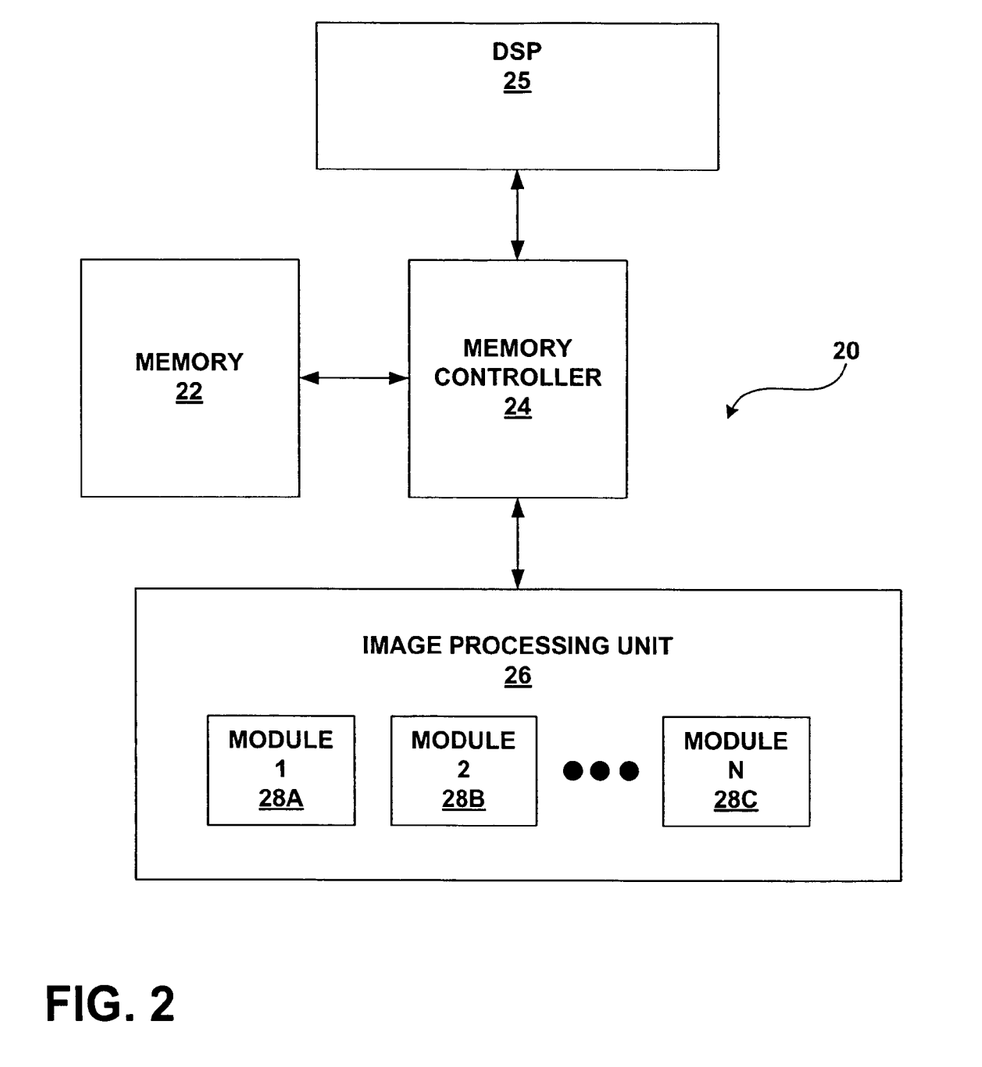
FIG. 2 is another block diagram illustrating an exemplary device that may implement the memory organization techniques described herein.

FIG. 2 is another block diagram illustrating an exemplary device 20 that may implement the memory organization techniques described herein. In this example, device 20 includes a memory 22 and a memory controller 24 that controls the access to memory 22. Memory controller 24 may be coupled to an image processing unit 26 that includes a plurality of image processing modules (labeled 28A, 28B and 28C and collectively referred to as "modules 28"). Image processing unit 26 may include any number of image processing modules 28, although three modules are illustrated for simplicity. Modules 28 may include a demosaicing module, a lens rolloff correction module, a scaling module, a color correction module, a color conversion module, and a spatial filtering module, or a number of other front-end image processing modules. Moreover, modules 28 may include multiple image processing modules that perform the same function, thereby allowing the function to be performed in parallel on different images.

In accordance with the techniques of this disclosure, pixels associated with several different images can be stored in the same memory word, and the memory word can be separated into such pixels, which can be processed in parallel by modules 28. In certain embodiments, image data associated with the different images can be concurrently read from memory 22 and distributed to modules 28. This, in effect, allows modules 28 to share memory 22 in an efficient manner.

Memory controller 24 may also be coupled to other devices, such as a digital signal processor (DSP) 25, or other types or hardware, processors, or logic circuitry. In this manner, the contents of memory 22 may be used in different types of hardware, processors, and processing units. Again, this disclosure specifically contemplates a memory organizational scheme that is very useful for image processing of the contents of memory 22, yet flexible so that other types of data can also be stored in memory 22.

Device 20 may correspond to device 2 of FIG. 1, but this disclosure is not necessarily limited in this respect. For example, memory 22 may correspond to either of memories 8 or 14 and memory controller 24 may correspond to memory controller 10. Image processing unit 26 may correspond to front-end video processing unit 18 and DSP 25 may correspond to video coding unit 19. Again, however, the architecture illustrated in FIG. 2 is more generally applicable to a number of devices and systems, and not necessarily limited to device 2 of FIG. 1.

In accordance with this disclosure, memory 22 is organized into memory words where each memory word may be used to store pixel data associated with a plurality of different images. For example, each of the memory words in memory 22 may be defined to support pixel data for several images, although if fewer images are currently being stored, a given word need not be fully populated with pixel data. As one example, a respective first pixel for several different images may be stored in a first memory word. The respective next pixel for each the different images may be stored in a second memory word. Thus, continuous pixels of several images can be stored in contiguous rows of memory 22, with each row being defined by a memory word that includes pixel data for several images.

Memory controller 24 is configured to allow for data extraction from the memory words in memory 22 so that different data of one memory word may be concurrently sent to different ones of modules 28 for parallel processing. Each of modules 28 may be configured to process its respective data in a time interval that is substantially similar (or identical) to the processing time of the other ones of modules. This allows for efficient simultaneous processing of image data.

However, if a particular memory word is used to store non-pixel data, such as an executable instruction, memory controller 24 allows the full memory word (in this case an instruction) to be sent to DSP 25. Other non-pixel information may also be stored in the memory words. Memory controller 24 can receive commands that define the contents of the memory words, and if a given memory word is used to store pixel data for several different images, memory controller 24 can concurrently separate such pixel data from the memory word so that the pixel data associated with different images can be processed in parallel.

Figure 3:
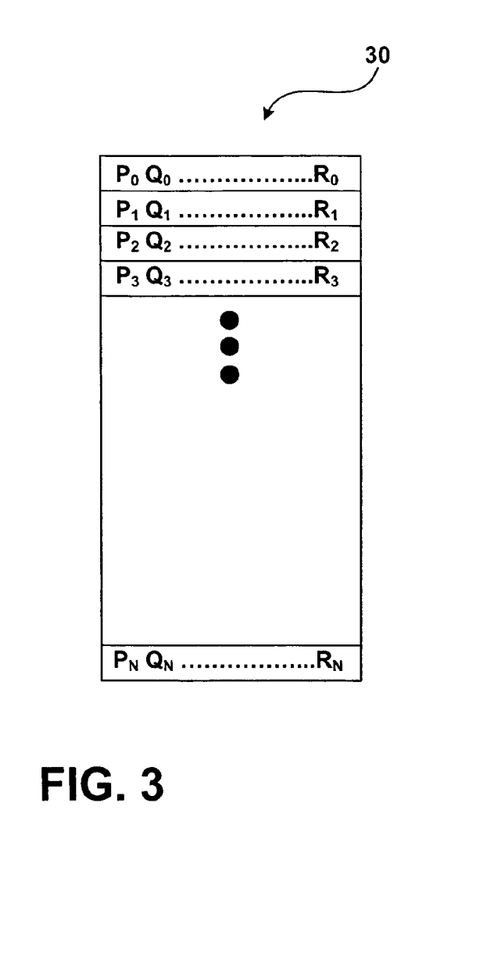
FIGS. 3 and 4 are diagrams illustrating exemplary memory organization according to this disclosure.

FIG. 3 is an exemplary diagram illustrating an exemplary memory organization according to this disclosure. Data structure 30 of FIG. 3 may be stored in memory 22. As shown in FIG. 3, each row of data structure 30 comprises a memory word that includes pixel data for a plurality of different images, i.e., zero or more images. For example, the first row (the first memory word) may include pixel data $P_0$ for image P, pixel data $Q_0$ for image Q, and pixel data $R_0$ for image R. $P_0$ may represent the first pixel of image P, $Q_0$ may represent the first pixel of image Q, and $R_0$ may represent the first pixel for image R. The first pixels of other images may also be included. For example, if the memory words are 64 bits wide, and each pixel comprises 8 bits, eight different pixels for eight different images may be stored in a single memory word.

Similarly, the second row (the second memory word) may include pixel data $P_1$ for image P, pixel data $Q_1$ for image Q, and pixel data $R_1$ for image R. $P_1$ may represent the second pixel of image P, $Q_1$ may represent the first pixel of image Q, and $R_1$ may represent the first pixel for image R. Thus, contiguous pixels of images P, Q and R may be stored in contiguous rows of memory. Each row may include only one pixel worth of data for several different images, although more than one pixel for a given image could also be stored in a given memory word.

In the example of data structure 30 of FIG. 3, every memory word is capable of storing pixel data for images P, Q and R. In this case, each image may include N+1 pixels, where N+1 represents the number of rows allocated to storage of the images. As described in greater detail below, one or more sections (or slots) of the memory words may not include any data, e.g., if only a few number of images are being processed and extra space exists in each of the memory words. Indeed, the same organizational scheme could be used to store and process a single image, in which case each memory word might include only one pixel of data. In this case, however, the extra space in each memory word would typically be unused.

Figure 4:
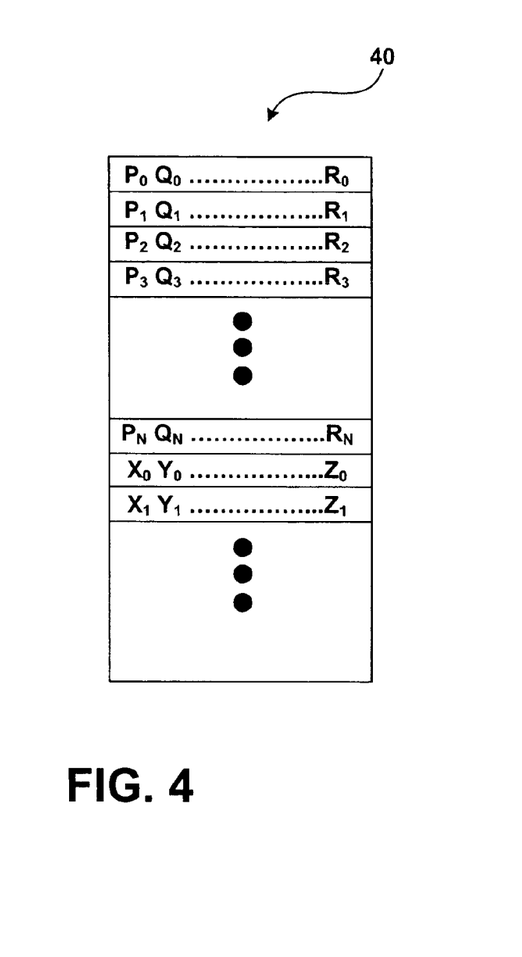

Moreover, data structure 30 may be repeated within a contiguous memory space, such as within memory 22 of FIG. 3, for each N+1 rows, thereby allowing additional groups of images to be stored using shared memory words, as further illustrated in FIG. 4.

FIG. 4 is another exemplary diagram illustrating memory organization according to this disclosure. Data structure 40 of FIG. 4 may be stored in memory 22 and represents a logical organization of the memory in accordance with this disclosure. As shown in FIG. 4, each row of data structure 40 comprises a memory word that includes pixel data for a plurality of different images. However, in this case, the first N+1 rows (the first N+1 memory words) include the pixel data for images P, Q and R, whereas subsequent rows (subsequent memory words) include the pixel data for images X, Y and Z.

The configuration of rows of memory words as illustrated in FIGS. 3 and 4 can be highly advantageous for front-end image processing. In this case, memory controller 24 can be configured to concurrently separate the pixel data for the different images, and forward the pixel data for different images to different image processing modules 28 of image processing unit 26. Thus, several images can be processed in parallel by image processing unit 26, allowing memory 22 to be efficiently shared by multiple modules 28. Furthermore, by traversing the full length of data structure 30 (FIG. 3) in memory 22, memory controller 24 can be certain that all the pixels of images P, Q, and/or R have been accessed. Thus, it is desirable to include one pixel of the respective images in each memory word, but all pixels of the images in contiguous memory words of data structure 30. In this case, one pass though data structure 30 can ensure the processing of any given image in data structure 30 by image processing unit 26.

At the same time, the relatively large width of the memory words (rows) in data structures 30 and 40 may allow such data to be used to store non-pixel data or other types of data. Examples of other types of data that may be stored in the memory include graphics depth information, z-buffer information of a graphics buffer, or computer executable software instructions. In yet another example, the stored data may comprise a cache used for any purpose, including non-video applications. Control signals may be received by memory controller 24 to define the nature of any memory word. For 64-bit memory words, some words may be executable software instructions, which can be accessed and forwarded to DSP 25 for execution. Other memory words may include the pixel data for different images (as shown in FIGS. 3 and 4). Still other words may include other types of data, such as graphics buffer information, or a cache. Importantly, memory controller 24 is configured to support these different types of information in the memory words of memory 22. Memory 22 itself may take any of a variety of physical configurations. For example, memory 22 may constitute eight banks of 8-bit wide memory modules. As another example, memory 22 may constitute two banks of 32-bit wide word addressable memory modules. As yet another example, memory 22 may comprise a single memory module that provides 64-bit wide word addressable memory.

Figure 5:
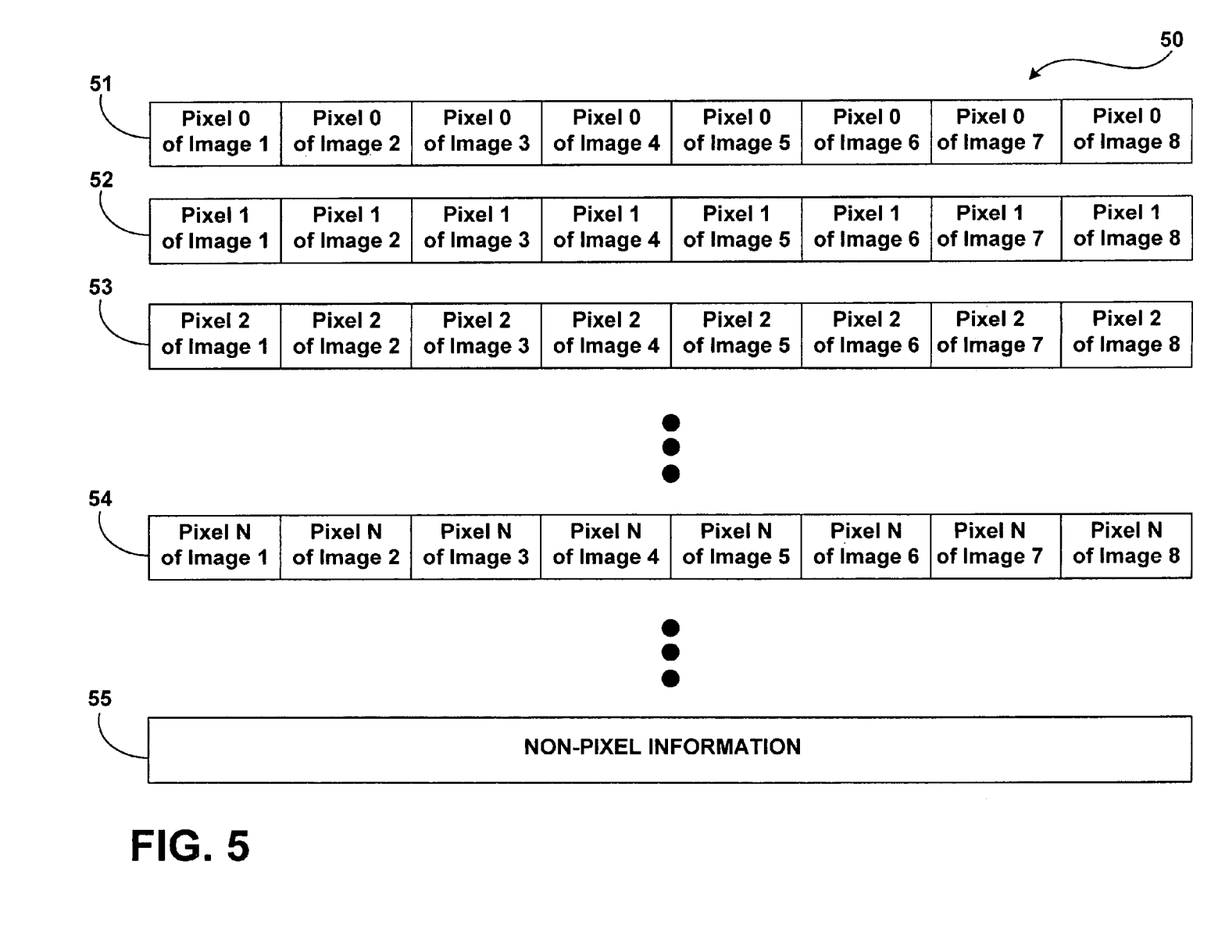
FIG. 5 is a diagram illustrating exemplary memory words organized with pixel data of different images according to this disclosure.

FIG. 5 is another diagram depicting memory words 51-55 organized with different types of data according to this disclosure. Memory words 51, 52, 53 and 54 include pixel data for several images, as described herein. For example, memory word 51 includes pixel 0 of eight different images. Similarly, memory word 52 includes pixel 1 of the eight different images, memory word 53 includes pixel 2 of the eight different images, and memory word 54 includes pixel N of the eight different images. In some cases, however, fewer than eight pixels may be stored in memory words 51-54. In this case one or more of the pixel "slots" may be empty, or stored with null data.

Each of the pixel "slots" in memory words 51-54 may correspond to a specific front-end image processing module. In particular, each of the eight images may have one pixel stored in the same "slot" of each memory word. In this way, if an image needs to be sent to a specific image processing module, the image can be stored in the corresponding "slot" of memory words 51-54. Then, one pass though memory words 51-54 can ensure that the pixels of a given image can be processed as needed. In still other examples, the same pixels may also be sent to multiple image processing modules.

Conventional front-end image processing is typically sequential. That is, a first process is often performed in its entirety, before a next process can be performed with respect to a given image. The teaching of this disclosure maintains the ability to perform sequential front-end image processing, but allows such processes to be performed in parallel with respect to several different images of a sequence. Referring again to FIG. 5, for example, image 1 may be stored in memory slots of memory words 51-54 that correspond to a first image processing module, whereas image 2 may be stored in memory slots of memory words 51-54 that correspond to a different image processing module. The other images, may similarly be stored in memory slots of memory words 51-54.

A given image may essentially pass through several slots of the memory words, following sequential front-end image processing and subsequent write backs to the memory. In other words, in FIG. 5, image 2 (which is stored in the second slot of memory words 51-54) may been previously stored in a different slot (such as the first slot), processed and then written back to the second slot. In this way, every image may still be processed in a sequential fashion. The memory organizational scheme, however, allows such sequential processing to be performed on several images in parallel (essentially making a so called imaging processing pipeline as images traverse through the different slots of the memory words via processing and write back). Memory controller 24 includes logic to facilitate pixel tracking, pixel separation from respective memory words, pixel forwarding to the appropriate modules 28, and pixel write back to different memory words.

Figure 6:
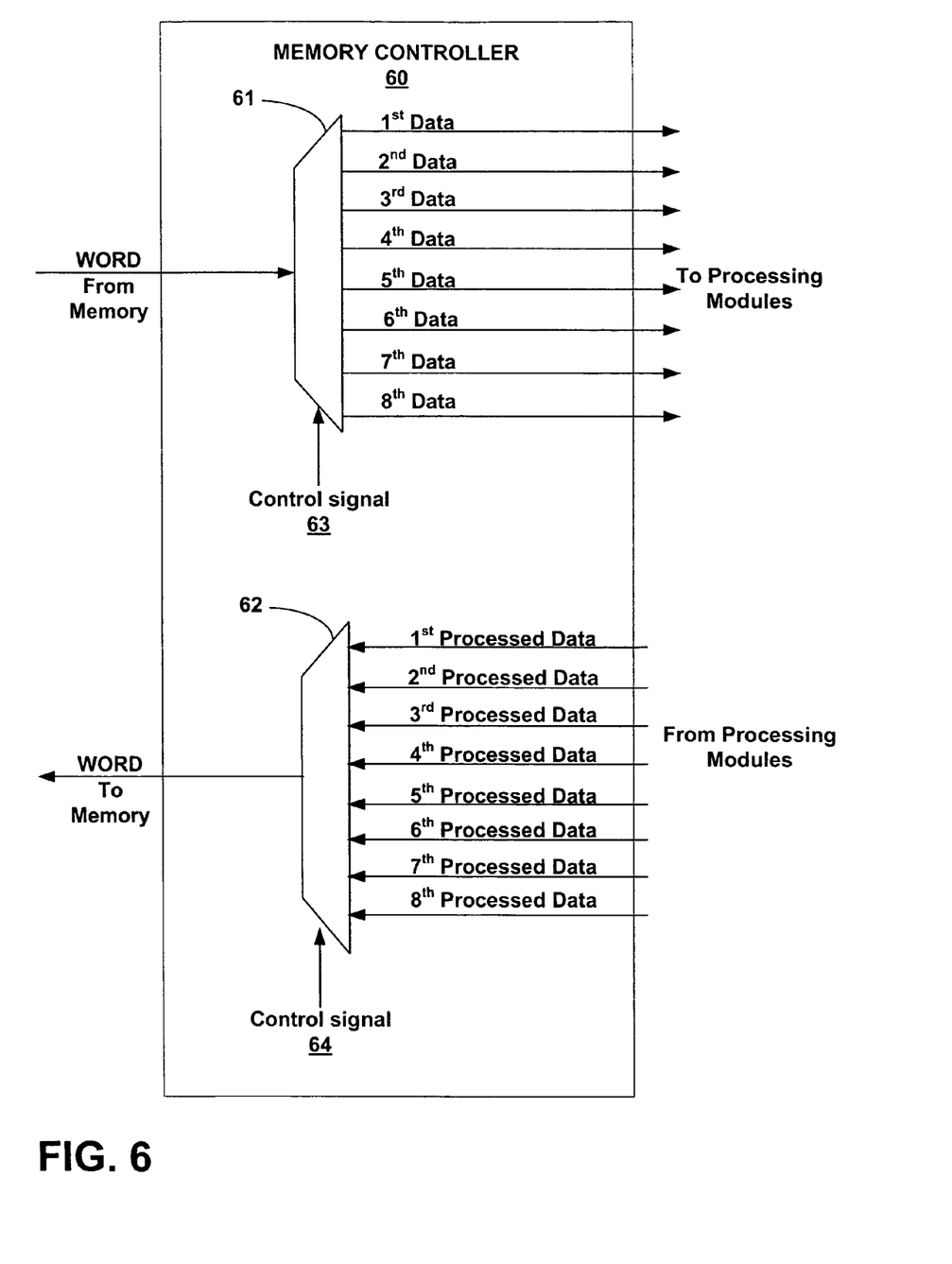
FIG. 6 is a block diagram illustrating an exemplary controller architecture to support the memory words described herein and allow the memory to be used for other purposes.

FIG. 6 is a block diagram of memory controller 60, which is one exemplary embodiment of memory controller 24 (FIG. 2). Memory controller 60 includes memory output logic 61 that facilitates concurrent data extraction from memory words stored in the memory so that different parts of the data in a given memory word can be forwarded to different processing modules. In addition, memory controller 60 includes memory input logic 62 that receives processed data and combines the processed data into a memory word that can be written back to the memory. Control signals 63 and 64 are sent to logic 61 and 62, respectively, to control how data flows in and out of the memory.

For example, when a memory word is received from the memory, output logic 61 can separate the data into various sub-parts, which can be sent to one or more different modules. In the Example of FIG. 6, the memory word may comprise one of memory words 51-55 of FIG. 5. For example, if memory word 51 is received from the memory, output logic 61 of memory controller can separate the pixel data of eight different images. Control signal 63 identifies what type of data is included in the memory word. Thus, the pixel data for the eight different images (as shown in memory word 51 of FIG. 5) may correspond to the $1^{st}$ data, the $2^{nd}$ data, the $3^{rd}$ data, the $4^{th}$ data, the $5^{th}$ data, the $6^{th}$ data, the $7^{th}$ data and the $8^{th}$ data (as shown in FIG. 6). Memory output logic 61 forwards the different data of a given memory word to different processing modules.

On the other hand, if a memory word 55 that comprises non-pixel information is received from the memory, output logic 61 of memory controller may determine where to send such information. For example, if memory word 55 is a computer executable instruction, memory word 55 may be forwarded to a common processing module, e.g., to DSP 25 (FIG. 2) for execution. Again, control signal 63 identifies what type of data is included in the memory word, and in this case, identifies memory word 55 as including non-pixel data such as a computer executable instruction to be executed by DSP 25.

Memory input logic 62 generally performs the inverse process of output logic 61 to write back data to the memory. Thus, if eight pixels of eight different images are processed by eight different modules, memory input logic 62 may receive the processed pixel data of the different images and combine the processed pixel data into a memory word that is written back to the memory. On the other hand, if the processed data corresponds to non-pixel data, control signal 64 may identify the data as such, and it may be stored in the memory as non-pixel data. In this manner, memory controller 60 allows for manipulation of pixel data of several different images in memory words, yet also supports the ability to store and extract non-pixel data from memory words stored in a common data structure of the memory.

Figure 7:
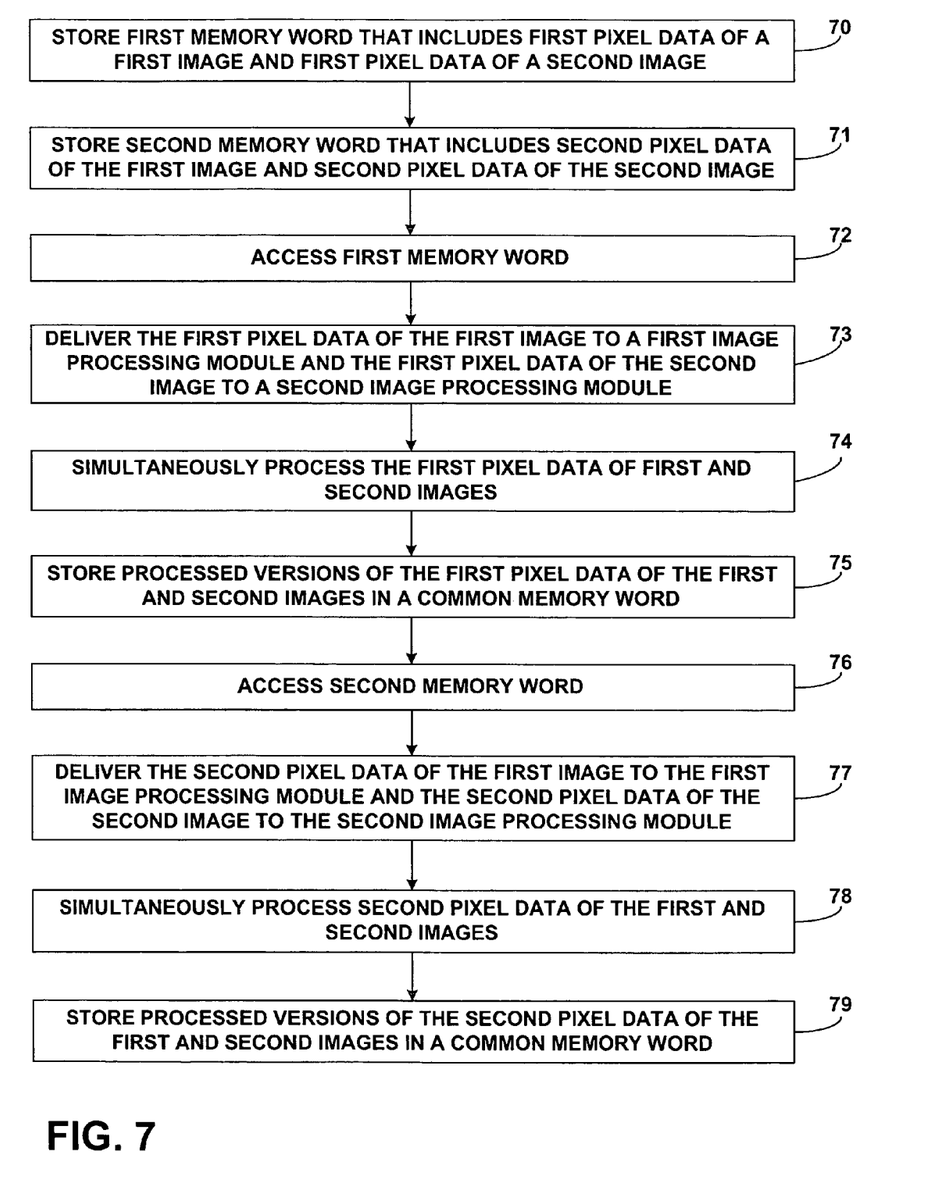
FIG. 7 is a flowchart illustrating an exemplary process according to an embodiment of this disclosure.

FIG. 7 is a flowchart illustrating a process according to an embodiment of this disclosure. FIG. 7 will be described in the context of FIG. 2. As shown in FIG. 7, memory 22 stores a first memory word that includes first pixel data of a first image and first pixel data of a second image (70). In other words, the memory word includes pixel data for two or more different images. Memory 22 also stores a second memory word that includes second pixel data of the first image and second pixel data of the second image (71). Thus, continuous memory words stored in memory 22 may store contiguous pixels of different images.

Memory controller 24 accesses the first memory word from memory 22, e.g., in memory cycle (72). The memory access by controller 24 may be in response to a front-end image processing command, e.g., delivered from image processing unit 26. Memory controller 24 delivers the first pixel data of the first image to a first image processing module (e.g., module 28A) and delivers the first pixel data of the second image to a second image processing module (e.g., module 28B) (73). Modules 28A and 28B simultaneously process the first pixel data of the first and second images (74), and return the processed results to memory controller 24. Memory controller 24 then stores processed versions of the first pixel data of the first and second images in a common memory word, e.g. in another memory cycle (75). The processed versions may be stored in a different memory word than the original memory word, and moreover, the processed versions of the pixel data may be moved to a different respective slot of the memory word so that subsequent processing of such data will occur in different ones of image processing modules 28.

Memory controller 24 then accesses the second memory word from memory 22, e.g., in another memory cycle (76), and delivers second pixel data of the first image to the first image processing module (e.g., module 28A) and delivers the second pixel data of the second image to a second image processing module (e.g., module 28B) (77). In this manner, modules 28A and 28B receive successive pixels of the same image for image processing. Modules 28A and 28B simultaneously process the second pixel data of the first and second images (78), and return the processed results to memory controller 24. Memory controller 24 then stores processed versions of the second pixel data of the first and second images in a common memory word, e.g., in another memory cycle (79). The process may continue for many continuous memory words stored in memory 22 so that modules 28A and 28B can process all of the pixels of the different images.

Although FIG. 7 is set fourth as a flow diagram, it should be noted that, in accordance with the teaching of this disclosure, the memory accesses typically occur in parallel with any image processing. This can ensure that there are no idle cycles to the memory between reads/writes. Thus, the flowchart of FIG. 7 should not be viewed as requiring the steps to be performed sequentially. Rather, one or more of the steps shown in FIG. 7 may be performed concurrently. In general, any time an image processing module uses a cycle for processing, a concurrent memory access can be performed to promote efficient use of processing time.

During a memory cycle, a memory word is extracted from memory, separated into its pixels, and the different pixels are forwarded for processing. During the next memory cycle, the processed versions of the pixels are combined and stored back to a common memory word. The process continues by cycling through the sequential memory words stored in the memory, with pixel extraction and subsequent write back, until all of the pixels of the memory words have been processed. Again, however, the memory accesses typically occur in parallel with image processing performed by the processing modules.

All the pixels of each image can be stored in contiguous memory words. In this manner, if a given image stored in the memory words needs to be processed, a complete pass through the memory words can ensure that a given module receives all of the pixels of that image. Furthermore, since pixels of several images are stored in the memory words, a complete pass through the memory words may allow for several sequential image processing techniques to be performed in a parallel with respect to the different images.

Again, the arrangement of image data in memory words, according to this disclosure, can improve front-end image processing bandwidth efficiency, which is particularly desirable for real-time VT applications. The described architecture for a memory controller specifically facilitates separation of the pixel data from each memory word, in order to allow the pixel data of different images to be sent to different image processing modules for parallel image processing. In addition, the memory organizational scheme described herein supports the ability to store other information, such as 32-bit or 64-bit instructions executed by a DSP, or data used for other applications. For example, the same memory may be used as a graphics buffer when not being use for storage of pixels in front-end image processing. At the same time, the described memory controller architecture allows the relatively wide memory words to be separated into smaller units, e.g., to separate out the pixels of several images from a given memory word, so that the pixels of several images can be processed in parallel by front-end image processing modules. In this manner, the described organizational scheme and controller architecture may accelerate front-end image processing, which is particularly desirable for real time VT applications, yet provide flexibility to the memory so that it can be used for other purposes, e.g., when front-end video processing is not being performed.

Nevertheless, various modifications may be made to the techniques described herein. For example, in some cases, the memory controller may be configured to send the same pixel data to more than one image processing module. Also, in some cases of 2D spatial filtering, one or more of the image processing modules may receive several lines of input (e.g., several pixels associated with contiguous images or contiguous pixels of an image), and may output one line of output (in this case a filtered output) based on the several lines of input. These and other embodiments are within the scope of the following claims.

The invention claimed is:

1. A method comprising:
accessing a first memory word of a memory that includes first pixel data for a first location in a first image and first pixel data for a first location in a second image, the first location of the first image and the second image being the same, wherein the first and second images are different images;
accessing a second memory word of the memory that includes second single pixel data for a second location in the first image and second pixel data for a second location in the second image, the second location of the first image and the second image being the same; and
delivering the first pixel data of the first image to a first image processing module and delivering the first pixel data of the second image to a second image processing module.

2. The method of claim 1, further comprising accessing a third memory word of the memory that includes third single pixel data of a first image and third single pixel data of the second image.

3. The method of claim 1, wherein the first memory word further includes first pixel data of a third image and wherein the second memory word further includes second pixel data of the third image.

4. The method of claim 1, wherein the first and second memory words comprise contiguous rows of the memory.

5. The method of claim 1, wherein contiguous pixels of the first and second images are stored in contiguous rows of the memory and the first and second memory words each include pixels from a plurality of images.

6. The method of claim 1, further comprising:
accessing the first memory word from the memory in a memory access cycle to concurrently retrieve the first pixel data and the second pixel data;
delivering the first pixel data of the first image to the first image processing module in response to accessing the first memory word in the memory access cycle; and
delivering the first pixel data of the second image to the second image processing module in response to accessing the first memory word in the memory access cycle.

7. The method of claim 6, further comprising:
processing the first pixel data of the first image in the first image processing module; and
simultaneously processing the first pixel data of the second image in the second image processing module.

8. The method of claim 7, further comprising:
combining a processed version of the first pixel data of the first image with a processed version of the first pixel data of the second image in a common memory word; and
storing the common memory word back to the memory in the different memory access cycle.

9. The method of claim 1, further comprising:
accessing the first memory word from the memory in a memory access cycle;
delivering the first pixel data of the first and second images to the first and second image processing modules in response to accessing the first memory word in the memory access cycle;
processing the first pixel data of the first and second images in the image processing modules; and
storing a processed version of the first pixel data of the first and second images back to the memory in a different memory access cycle wherein the processed versions of the first pixel data of the first and second images are stored in a common memory word of the memory.

10. The method of claim 1, further comprising accessing non-pixel data in the memory.

11. The method of claim 1, wherein the first memory word conforms to a width of an instruction executable by a processor, the method further comprising storing first pixel data from a plurality of images including the first image and the second image to pack an entire width of the first memory word with pixel data.

12. A device comprising:
a memory configured to store a first memory word that includes first pixel data for a first location in a first image and first pixel data for a first location in a second image, the first location of the first image and the second image being the same, and a second memory word that includes second single pixel data for a second location in the first image and second pixel data for a second location in the second image, the second location of the first image and the second image being the same, wherein the first and second images are different images; and a controller that accesses the first memory word in a memory access cycle to deliver the first pixel data of the first image to a first image processing module and to deliver the first pixel data of the second image to a second image processing module.

13. The device of claim 12, wherein the memory is configured to store a third memory word that includes third single pixel data of a first image and third single pixel data of the second image.

14. The device of claim 12, wherein the first memory word further includes first pixel data of a third image and wherein the second memory word further includes second pixel data of the third image.

15. The device of claim 12, wherein the first and second memory words comprise contiguous rows of the memory.

16. The device of claim 12, wherein contiguous pixels of the first and second images are stored in contiguous rows of the memory and the first and second memory words each include pixels from a plurality of images of a video sequence.

17. The device of claim 12, further comprising:
the first image processing module; and
the second image processing module, wherein the controller delivers the first pixel data of the first image to the first image processing module in response to accessing the first memory word in the memory access cycle, and the controller delivers the first pixel data of the second image to the second image processing module in response to accessing the first memory word in the memory access cycle.

18. The device of claim 17, further wherein:
the first image processing module processes the first pixel data of the first image; and
the second image processing module simultaneously processes the first pixel data of the second image.

19. The device of claim 18, further wherein:
the controller combines a processed version of the first pixel data of the first image with a processed version of the first pixel data of the second image in a common memory word; and
the controller stores the common memory word back to the memory in the different memory access cycle.

20. The device of claim 12, further comprising the first and second image processing modules, wherein:
the controller delivers the first pixel data of the first and second images to the image processing modules in response to accessing the first memory word in the memory access cycle;
the image processing modules process the first pixel data of the first and second images; and
the controller stores a processed version of the first pixel data of the first and second images back to the memory in a different memory access cycle, wherein the processed versions of the first pixel data of the first and second images are stored in a common memory word of the memory.

21. The device of claim 12, wherein the memory is further configured to store non-pixel data.

22. The device of claim 12, further comprising:
a processor capable of executing instructions;
wherein the first memory word conforms to a width associated with the instructions, and
wherein the memory stores first pixel data from a plurality of images including the first image and the second image to pack an entire width of the first memory word with pixel data from the plurality of images.

23. A memory controller, wherein the memory controller is configured to:
access a first memory word stored in a memory that includes first pixel data for a first location in a first image and first pixel data for a first location in a second image, the first location of the first image and the second image being the same, wherein the first and second images are different images;
access a second memory word stored in the memory that includes second single pixel data for a second location in the second image, the second location of the first image and the second image being the same;
deliver the first pixel data of the first image to a first image processing module; and
deliver the first pixel data of the second image to a second image processing module.

24. The memory controller of claim 23, further being configured to access a third memory word that includes third single pixel data of a first image and third single pixel data of the second image.

25. The memory controller of claim 23, wherein the first memory word further includes first pixel data of a third image and wherein the second memory word further includes second pixel data of the third image.

26. The memory controller of claim 23, wherein the first and second memory words comprise contiguous rows of the memory.

27. The memory controller of claim 23, wherein contiguous pixels of the first and second images are stored in contiguous rows of the memory and the first and second memory words each include pixels from a plurality of images of a video sequence.

28. The memory controller of claim 23, further being configured to access non-pixel data stored in the memory.

29. The memory controller of claim 23, wherein the memory words comprise 64 bits and the first and second pixels each comprise 8 bits.

30. The memory controller of claim 29, further wherein:
the first memory word includes first pixel data of a third image and the second memory word includes second pixel data of the third image;
the first memory word includes first pixel data of a fourth image and the second memory word includes second pixel data of the fourth image;
the first memory word includes first pixel data of a fifth image and the second memory word includes second pixel data of the fifth image;
the first memory word includes first pixel data of a sixth image and the second memory word includes second pixel data of the sixth image;
the first memory word includes first pixel data of a seventh image and the second memory word includes second pixel data of the seventh image; and
the first memory word includes first pixel data of an eighth image and the second memory word includes second pixel data of the eighth image.

31. The memory controller of claim 29, wherein the memory includes at least 512 rows that define at least 512 memory words, each of which includes pixel data of two or more images.

32. The method of claim 1, further comprising encoding the first image and the second image.

33. The device of claim 12, further comprising a coding unit configured to encode the first image and the second image.

34. The memory controller of claim 23, further being configured to encode the first image and the second image.

35. The method of claim 1, further comprising performing at least one of demosaicing, lens rolloff correction, scaling, color correction, color conversion, and spatial filtering on the first pixel data of the first image and the first pixel data of the second image in parallel.

36. The device of claim 12, wherein the first image processing module and the second image processing module are configured to perform at least one of demosaicing, lens rolloff correction, scaling, color correction, color conversion, and spatial filtering on the first pixel data of the first image and the first pixel data of the second image respectively in parallel.

37. The memory controller of claim 23, further being configured to perform at least one of demosaicing, lens rolloff correction, scaling, color correction, color conversion, and spatial filtering on the first pixel data of the first image and the first pixel data of the second image in parallel.

* * * * *

UNITED STATES PATENT AND TRADEMARK OFFICE
CERTIFICATE OF CORRECTION

| | | |
|---|---|---|
| PATENT NO. | : 8,045,021 B2 | Page 1 of 1 |
| APPLICATION NO. | : 11/327241 | |
| DATED | : October 25, 2011 | |
| INVENTOR(S) | : Cheung et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1031 days.

Signed and Sealed this
Twentieth Day of March, 2012

David J. Kappos
*Director of the United States Patent and Trademark Office*